United States Patent
Duarte et al.

(10) Patent No.: US 8,331,471 B1
(45) Date of Patent: Dec. 11, 2012

(54) LOW BIT-RATE FEEDBACK FOR WIRELESS COMMUNICATION SYSTEMS WITH REDUCED COMPUTATIONAL COMPLEXITY

(75) Inventors: Melissa Duarte, Houston, TX (US); Ashutosh Sabharwal, Houston, TX (US); Christopher H. Dick, San Jose, CA (US); Raghavendar M. Rao, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 1558 days.

(21) Appl. No.: 11/825,373

(22) Filed: Jul. 5, 2007

(51) Int. Cl.
*H04B 7/02* (2006.01)
*H04L 1/02* (2006.01)

(52) U.S. Cl. ........................................ 375/267
(58) Field of Classification Search .................. 375/267
See application file for complete search history.

(56) References Cited

U.S. PATENT DOCUMENTS 5,815,531 A * 9/1998 Dent .............................. 375/298
2006/0268623 A1 * 11/2006 Chae et al. ............... 365/189.01

OTHER PUBLICATIONS

Duarte M. et al. "A Vector Mapping Scheme for Efficient Implementation of Beamforming MIMO Systems", Asilomar Conference on Signals, Systems and Computers, Oct. 29-Nov. 1, 2006, Pacific Grove, California, USA.*
Love D. J., et al., "Grassmannian Beamforming for Multiple-Input Multiple-Output Wireless Systems", IEEE Trans. Information Theory, vol. 49, No. 10, pp. 2735-2747, Oct. 2003.
Mondal,B., et al., "Algorithms for Quantized Precoded MIMO-OFDM Systems", in Proc. of Third SPIE Int. Symp. On Fluctuations and Noise, Austin, TX, pp. 381-385, May 2005.
Alamouti, S. M., "A Simple Transmit Diversity Technique for Wireless Communications", IEEE Journal on Select Areas in Communications, vol. 16, No. 8, pp. 1451-1458, Oct. 1998.
Duarte, M. et al., "A Vector Mapping Scheme for Efficient Implementation of Beamforming MIMO Systems", Asilomar Conference on Signals, Systems, and Computers, Oct. 29-Nov. 1, 2006, Pacific Grove, California, USA, 7 pages.

* cited by examiner

*Primary Examiner* — David C. Payne
*Assistant Examiner* — Tanmay Shah
(74) *Attorney, Agent, or Firm* — W. Eric Webostad; John J. King

(57) ABSTRACT

Low bit-rate feedback wireless communication systems with reduced computational complexity is described. A first set of information is obtained and mapped to a set of regions. Each region of the set of regions has at least one portion with a zero value. The at least one portion is selected from a group consisting of an imaginary portion and a real portion. A second set of information is provided responsive to the mapping and stored for access by at least one component of the wireless communication system.

17 Claims, 7 Drawing Sheets

LOW BIT-RATE FEEDBACK FOR WIRELESS COMMUNICATION SYSTEMS WITH REDUCED COMPUTATIONAL COMPLEXITY

FIELD OF THE INVENTION

One or more aspects of the invention relate generally to communication systems and, more particularly, to low bit-rate feedback for wireless communication systems with reduced computational complexity.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex™ FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

More recently, architectures for beamforming in multiple-input multiple-output ("MIMO") wireless communication systems have used a feedback channel from the receiver to the transmitter. Wireless communication systems involved in beamforming can also be MISO (multiple-input single-output) systems. The feedback channel is used to communicate information regarding the spatial channel, or simply "channel", (i.e. channel state information ("CSI")), in order to tailor communication from the transmitter to the receiver. This feedback channel may use a wireless channel. The CSI estimated at the receiver is conventionally quantized (e.g., represented using a finite number of bits) before being sent to the transmitter. As is known, the IEEE 802.16 standard used 6 bits to represent a spatial channel from one transmitter to one receiver (e.g., 6 bits to represent a complex number). As an example, for a MISO channel with 4 transmit antennas and 1 receive antenna, an implementation for this would use 24 bits.

As is known, a receiver transmits feedback information, and this feedback information is conventionally associated with inner-symbol interference ("ISI"), fading, among other types of information associated with reflection-induced hindrances to communication between transmitter and receiver. For MIMO and MISO wireless communication systems, multiple antennas may be used at both receiver and transmitter or only at the transmitter. Accordingly, the number of possible spatial channels which may be used increases with the number of antennas used. Thus, the need for feedback channel bandwidth likewise increases with an increase in the number of spatial communication channels as previously described. To combat the increased demand for feedback channel bandwidth associated with MISO and MIMO beamforming applications, the IEEE 802.16e standard has included a low bit-rate feedback scheme. However, such a low bit-rate feedback scheme is significantly computationally intensive and thus may involve implementing a significant number of hardware resources, including a significant number of multipliers.

An Orthogonal Frequency Division Multiplexing ("OFDM") wireless communication system may divide a broad band wireless channel into a set of parallel narrow band channels. These narrow band channels in the context of OFDM wireless communication system may be referred to as sub-channels or subcarriers. Multiple antennas at the transmitter or receiver can be added to an OFDM system to form MIMO-OFDM or MISO-OFDM systems. Such a MIMO-OFDM or MISO-OFDM system can be considered to add MIMO or MISO capability to each of the parallel narrowband channels. The above mentioned low bit rate feedback scheme refers to feeding back CSI for one or more of parallel narrow band channels, also referred to earlier as sub-channels or subcarriers.

Accordingly, it would be both desirable and useful to provide means for generally minimizing the computational/hardware complexity associated with implementing the low bit-rate feedback from a receiver to a transmitter. Furthermore, it would be both desirable and useful if such means for low bit-rate feedback approximated performance of the more computationally intensive IEEE 802.16e low bit-rate feedback scheme and could be used in systems using the low bit-rate feedback IEEE 802.16e scheme.

SUMMARY OF THE INVENTION

One or more aspects of the invention generally relate to communication systems and, more particularly, to low bit-rate feedback for wireless communication systems with reduced computational complexity.

An aspect of the invention relates generally to a method for low bit-rate feedback for a wireless communication system. A first set of information is obtained and mapped to a set of regions. Each region of the set of regions has at least one portion with a zero value. The at least one portion is selected from a group consisting of an imaginary portion and a real portion. A second set of information is provided responsive to the mapping and stored for access by at least one component of the wireless communication system.

Another aspect of the invention relates generally to a receiver for a Multiple-Input Single-Output ("MISO") or Multiple-Input Multiple-Output ("MIMO") wireless communication system. A quantizer has access to a mapped codebook, which is generated by obtaining a first set of information and mapping the first set of information to a set of regions. Each region of the set of regions has at least one portion with a zero value. The at least one portion is selected from a group consisting of an imaginary portion and a real portion. The set of regions consists of five regions associated with mapping values $0+j0$, $1+j0$, $-1+j0$, $0+j1$, and $0-j1$. A second set of information is provided responsive to the mapping and stored as the mapped codebook for access by the quantizer. The quantizer is configured in part for determining:

$$Q_i^M = H_k c_i;$$

for $H_k$ a channel matrix corresponding to subcarrier k, for the mapped codebook of $c_i$ vectors for i of a fixed cardinality without using a multiplier by using circuitry to provide 0, $H_{r,t}$, $-H_{r,t}$, j $H_{r,t}$, and $-j$ $H_{r,t}$ for each entry $H_{r,t}$ of the channel matrix $H_k$, where $H_{r,t}$ denotes an entry in a row r and a column t of the channel matrix $H_k$, as respective input sets for multiplexed selection responsive to a region of the set of regions for providing both the imaginary portion and the real portion of $H_{r,t} c_{i,t}$, where $c_{i,t}$ denotes a $t^{th}$ entry of the vector $c_i$.

Yet another aspect of the invention relates generally to a transmitter for a MISO or MIMO wireless communication system. A beamformer for eigen mode beamforming has access to a mapped codebook. The mapped codebook is generated by obtaining a first set of information and mapping the first set of information to a set of regions. Each region of the set of regions has at least one portion with a zero value. The at least one portion is selected from a group consisting of an imaginary portion and a real portion. The set of regions consists of five regions associated with mapping values 0+j0, 1+j0, −1+j0, 0+j1, and 0−j1. A second set of information is provided responsive to the mapping and stored as the mapped codebook for access by the beamformer. The beamformer is coupled to receive an index to the mapped codebook for selecting a codeword therefrom. The index is indicative of the codeword for use by the transmitter for the eigen mode beamforming. The index is obtained by the transmitter via a wireless feedback path.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
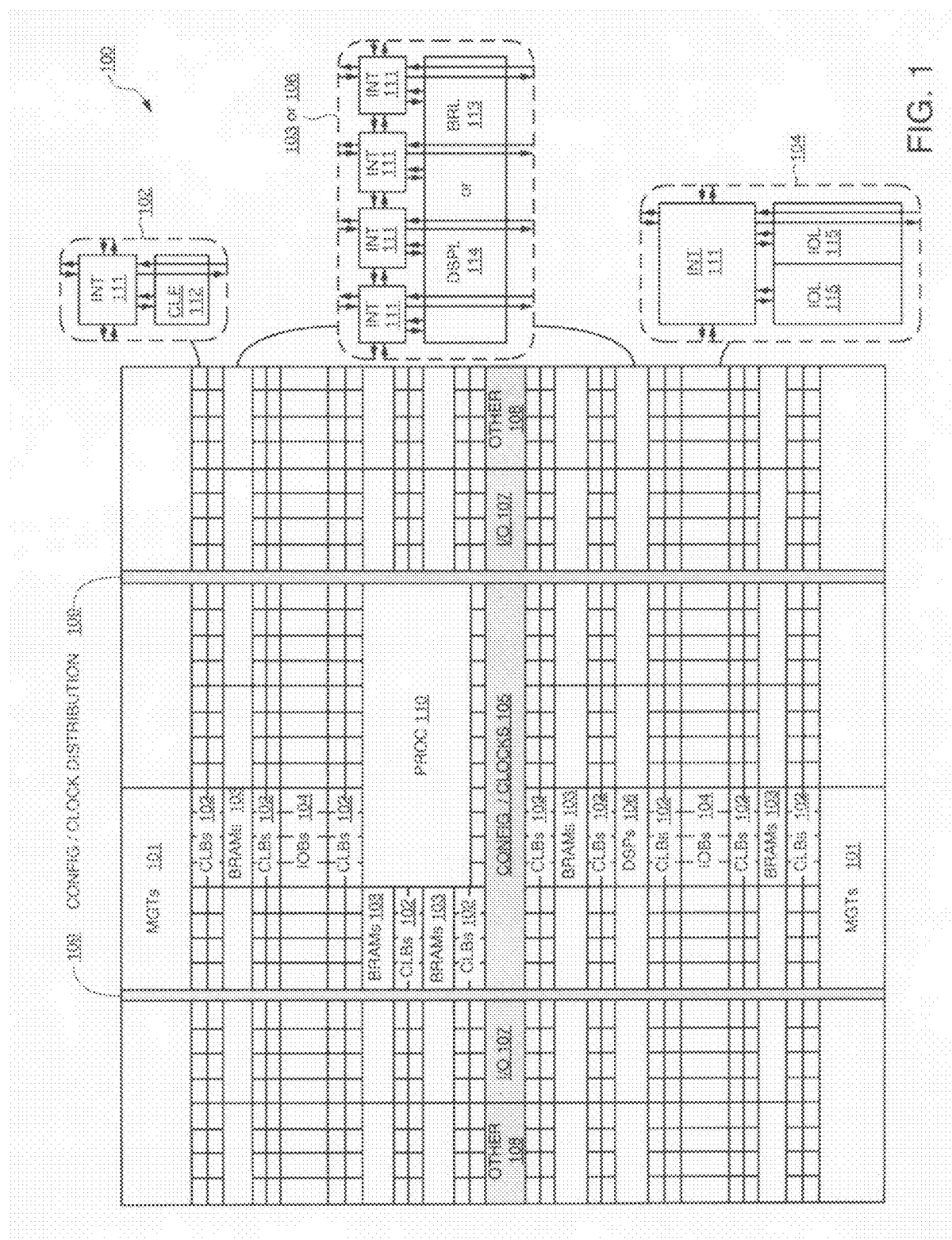
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex™-4 or Virtex™-5 FPGA from Xilinx, Inc. of San Jose, Calif.

Figure 2A:
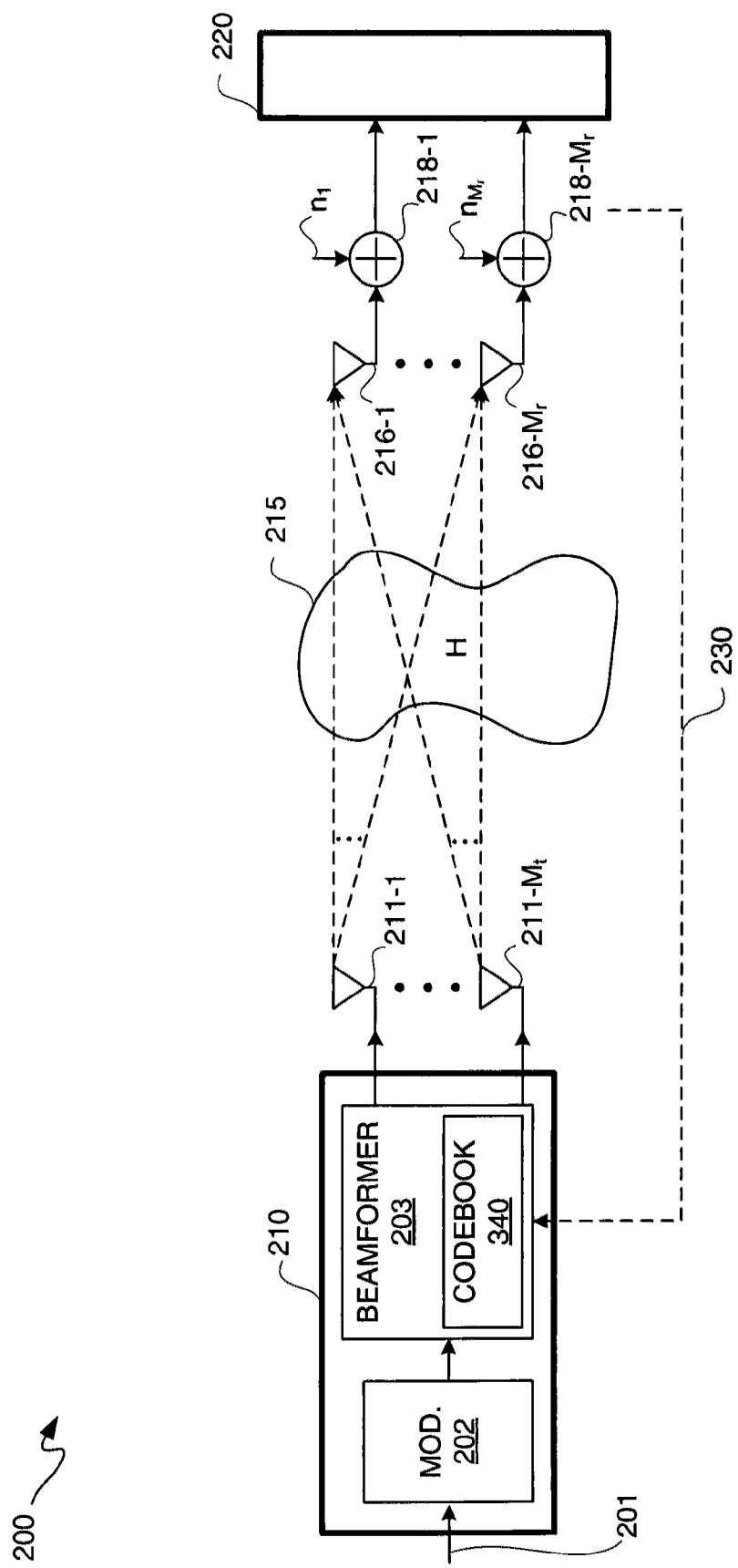
FIG. 2A is a block diagram depicting an exemplary embodiment of a multiple-input multiple-output ("MIMO") wireless communication system.

FIG. 2A is a block diagram depicting an exemplary embodiment of a MIMO wireless communication system 200. Notably, FIG. 2A is a baseband representation of a wireless communication system 200, and for purposes of clarity and not limitation, known elements such as a digital-to-analog converter or an analog-to-digital converter have been omitted. Wireless communication system 200 includes transmitter 210 and receiver 220. Note, that if wireless communication system 200 were to have just one receive antenna 216-1 and multiple transmit antennas, then wireless communication system 200 would be a MISO wireless communications system. However, for purposes of clarity by way of example and not limitation, it shall be assumed that there are multiple transmit antennas and multiple receive antennas, and thus wireless communication system 200 is a MIMO wireless communication system. A data or bit stream 201 is input to transmitter 210, and more particularly to modulator 202 of transmitter 210. The data input via data stream 201 is formed into symbols, s, for output to beamformer 203. Beamforming by beamformer 203 is employed by applying a beamforming vector $w_i$ to a symbol s prior to supplying beamforming data to an arrangement of antennas. Notably, i is an integer index value indicating a codeword, or equivalently a beamforming vector, in a codebook. The codeword in the codebook may include one or more numbers, generally of a complex form, where there is one of such numbers for each transmit antenna of a transmitter for example.

An arrangement of transmit antennas 211-1 through 211-$M_t$ delivers RF waveforms to one or more associated spatial communication channels H 215. Notably, there may be one or more transmit antennas, but for a beamforming wireless system there are at least two or more transmit antennas. For a transmission, conventionally all transmit antennas of a transmitter are used. Thus, transmitter 210 is capable of transmitting symbols to receiver 220 over a channel matrix H 215 of a wireless communication system 200 to provide configuration information of transmitter 210 to receiver 220, such as the number of transmit antennas 211-1 through 211-$M_t$.

Generally, there are two types of beamformers, namely geometric beamformers and eigen mode beamformers. Geometric beamforming is a form of directional beamforming, and eigen mode beamforming transmits information responsive to eigen modes of a channel. With respect to eigen mode beamforming, each channel has an eigen structure. Thus, eigen vectors associated with a channel may be used such that RF waveforms may be orthogonal with respect to one another.

From transmit antennas 211-1 through 211-$M_t$, RF waveforms are used to communicate information via any of a number of spatial channels H 215 to receive antennas 216-1 through 216-$M_r$. Notably, the number of available spatial channels may vary from application to application. However, for a receiver equipped with $M_r$ receive antennas, after some initial processing which may include down conversion for example, outputs from such receive antennas may be delivered to a baseband processor for combining and subsequent processing to produce an estimate of transmitted symbols. Notably, there may be one or more receive antennas, and the number of receive antennas may though need not equal the number of transmit antennas. However, for purposes of clarity by way of example, it shall generally be assumed that there are multiple receive antennas and multiple transmit antennas.

Channel state information ("CSI") may be exploited, at both transmitter 210 and receiver 220, to increase system data capacity in comparison to capacity realizable by a single transmit/receive antenna pair system. In addition to increased data capacity, CSI may be used to provide a more robust communication link, suppress interference from undesirable sources, or a combination of any of increased data capacity, more robust communication links, or greater suppression of interference.

To take advantage of CSI, a transmitter has access to a representation of each spatial channel, for example each spatial channel H 215 that transmitter 210 may use to communicate with receiver 220. This CSI for the channels used may be provided from receiver 220 to transmitter 210 via a wireless feedback path 230. Notably, a wired feedback channel need not be used for feedback path 230, as feedback path 230 may be a low bit-rate wireless data link. In addition to reducing system costs, use of a low bit-rate wireless data link may further reduce usage of spectral resources.

As indicated above, CSI may include a decomposition of a channel H into orthogonal data pipes, using singular value decomposition ("SVD"). It should be noted that singular values of a channel matrix H, obtained by SVD, are the square roots of the eigen-values of HH* or H*H obtained by eigen-value decomposition. HH* represents the multiplication of such a channel matrix H with its Hermitian-transpose matrix H*. It should also be noted that left singular vectors of H obtained by SVD are eigen-vectors of HH* and right singular vectors of H, obtained by SVD, are the eigen-vectors of H*H. An input singular vector, as determined by receiver 220, may be transmitted from receiver 220 to transmitter 210 using feedback path 230.

An issue associated with transmitting of CSI using SVD communicated via a feedback or reverse channel is representing the channel input singular vectors with a low bit rate. Given the number of possible spatial channels and subcarriers over which data may be communicated, the CSI to be fed back may involve a significant amount of data. Furthermore, it should be appreciated that the eigen structure of a channel is known to be numerically delicate, and a large number of bits for accurate representation is generally involved. Accordingly, in IEEE 802.16e, a quantized beamforming codebook-based approach has been suggested. A codebook which is known a priori to both the transmitter and receiver is used as a basis for a beamformer of transmitter 210 to select a beamforming vector and as a basis for a maximum ratio combiner of receiver 220 to compute a combining vector.

It should be appreciated that for multiple transmit antennas 211-1 through 211-$M_t$, beamformer 203 may have a beamforming vector associated with each realization of channel H 215. The beamforming vector may have as many entries as the number of transmit antennas $M_t$. Thus, each symbol provided from modulator 202 to beamformer 203 may be provided to a respective multiplier (not shown) thereof, where each multiplier has an input of a beamforming vector associated with a transmit antenna and an input symbol s from modulator 202. For example, suppose there are four transmit antennas for $M_t$ equal to 4, the beamforming vector corresponding to a realization of channel matrix H 215 may be four complex numbers associated with the eigen vectors of this realization of channel matrix H 215. These four complex numbers in the beamforming vector in this example may thus form a code word.

There are various known codebook constructions. Examples of codebook constructions include use of Grassmannian and Unitary Space-Time Constellation, among other known constructions for codebooks. IEEE 802.16e specifies one such codebook. In "Grassmannian Beamforming for Multiple-Input Multiple-Output Wireless Systems" by D. J. Love and R. W. Heath, published in IEEE Trans. Information Theory, Volume 49, No. 10, pp. 2735-2747, October 2003, given W, which is a set of beamforming vectors in a codebook, or in short a "codebook", the best beamforming vector $w_o$ chosen from the set W, namely the beamforming vector $w_o$ chosen from W that maximizes the signal-to-noise ratio ("SNR") at the receiver, may be computed according to:

$$w_0 = \underset{x \in W}{\mathrm{argmax}} \|Hx\|_2 \quad (1)$$

where H, which in our example is H 215, is the $M_r \times M_t$ dimensioned channel matrix, the $\|\cdot\|_2$ denotes the matrix 2-norm, and W is a set of codewords or beamforming vectors in a codebook, or in short a "codebook." Thus, x is a variable that takes as value all the possible codewords or beamforming vectors from the set of beamforming vectors W, and from Equation (1), the beamforming vector that yields the maximum SNR may be selected. In other words, by doing a full or exhaustive search in the receiver, for over all codewords in a codebook, a codeword or beamforming vector to be used by a transmitter is selected. This exhaustive search to find such a codeword is an operation which is performed by a quantizer which is part of receiver 200, namely quantizer 232 of FIG. 2B.

Signals received at each of receive antennas 216-1 through 216-$M_r$ are subject to distortion by additive white Gaussian noise ("AWGN") in associated receive-side circuitry before being processed by baseband receiver 220. This associated receive-side circuitry is represented by adders 218-1 through 218-$M_r$ with respective additive value $n_1$ through $n_{M_r}$ indicating AWGN.

Figure 2B:
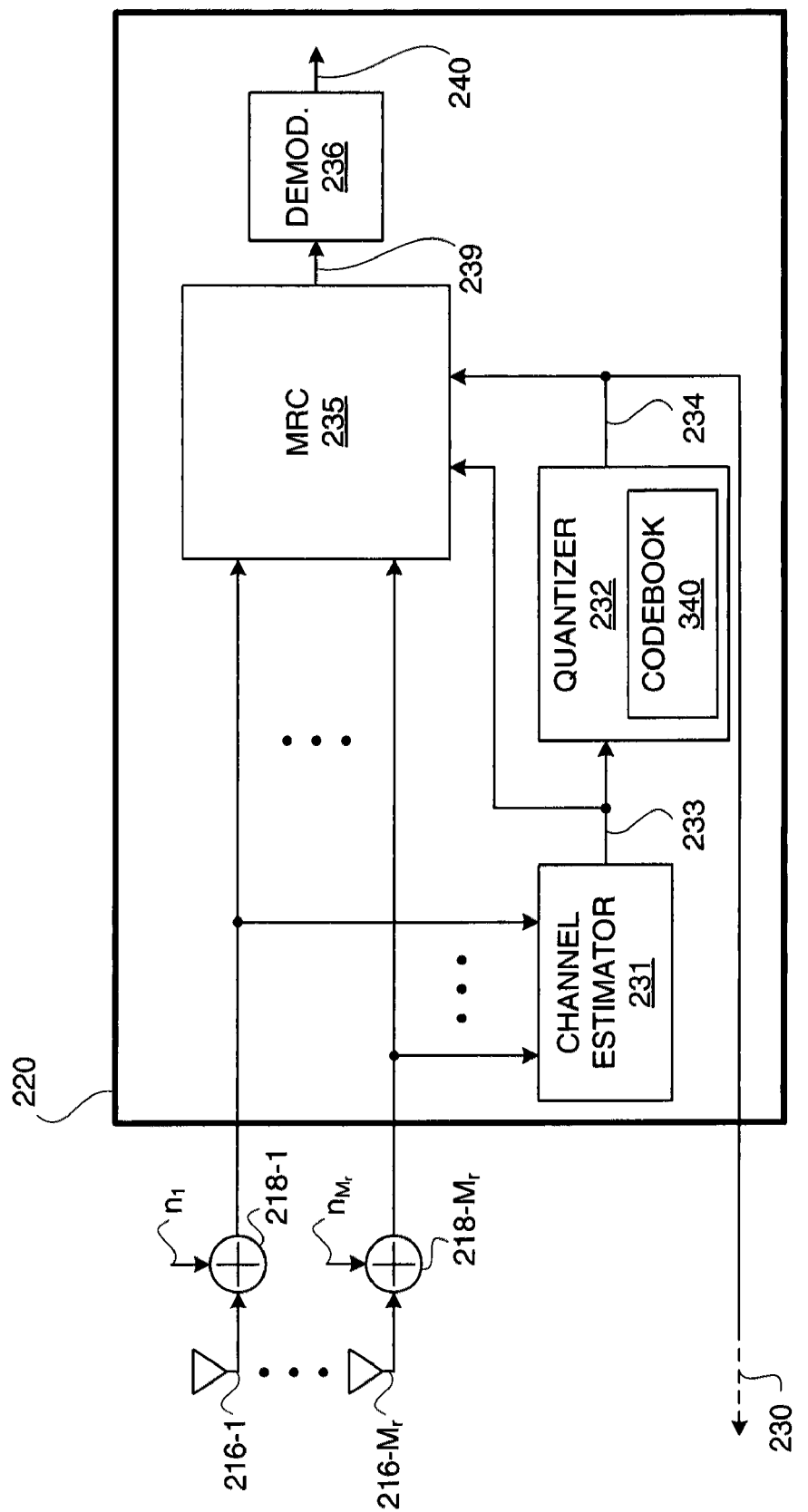
FIG. 2B is a block diagram depicting an exemplary embodiment of a baseband representation of a receiver of the MIMO wireless communication system of FIG. 2A.

Signals from antennas 216-1 thru 216-$M_r$ corrupted by AWGN noise are provided to receiver 220 for further processing as described in additional detail with reference to FIG. 2B. However, it should be appreciated that because transmitter 210 and receiver 220 have been preconfigured with a predetermined, common set of codewords, where each has access to the same codebook, only an index need be transmitted by receiver 220 via feedback path 230 to transmitter 210 to identify a codeword in such set of codewords to use. Notably, the number of codewords in a codebook is conventionally restricted to a fixed cardinality N. Thus, rather than having to provide via feedback path 230 a number of complex values, an index which may be a few bits wide may be used. For IEEE 802.16e, the index is a 3-bit wide value, and thus the fixed cardinality of N is equal to $2^3=8$. This means that there are at most 8 codewords in a codebook specified by IEEE 802.16e standard. However, it should be appreciated that for multiple transmit antennas, each codeword or beamforming vector generally has the form of a vector of complex numbers, where the number of complex numbers is determined by the number of transmit antennas. In FIG. 2A, dashed lines indicate possible wireless channels or subcarriers for channel matrix H 215. Additionally, a dashed line is used to indicate wireless feedback channel 230. Notably, antennas are not shown for wireless feedback channel 230 for purposes of clarity and not limitation. Alternatively, feedback channel 230 may be a wired connection.

FIG. 2B is a block diagram depicting an exemplary embodiment of a baseband representation of receiver 220 of FIG. 2A. With continuing reference to FIG. 2B and renewed reference to FIG. 2A, description of communication system 200 is continued. Receiver 220 includes maximum ratio combining block ("MRC") 235, demodulator 236, channel estimator 231, and quantizer 232. Inputs to the receiver 220 are respectively provided to MRC 235 and channel estimator 231. Output of channel estimator 231 is H 233, namely a dimensioned channel matrix.

Output H 233 is provided as an input to quantizer 232 and to MRC 235. As previously mentioned, quantizer 232 responsive to output H 233 does an exhaustive search to find at least an approximate maximum SNR codeword for a beamforming by transmitter 210. Accordingly, quantizer 232 provides an index 234 as an output, where index 234 indicates a codeword for use by transmitter 210 to at least approximately maximize SNR for a transmission as previously described.

Index 234 is provided via wireless feedback path 230 to beamformer 203 of transmitter 210 of FIG. 2A. Notably, for purposes of clarity by way of example and not limitation, it is assumed that the index provided via feedback path 230 is provided over an error-free, zero-delay wireless feedback channel. Furthermore, output index 234 of quantizer 232 is provided as an input to MRC 235.

Codebook 340 may be loaded into memory as part of the configuration of transmitter 210 and receiver 220. Codebook 340 may be loaded in memory which is part of or accessible by beamformer 203 of FIG. 2A at transmitter 210, and codebook 340 may be loaded into memory which is part of or accessible by quantizer 232 of receiver 200. As illustratively shown, respective memory for beamformer 203 and quantizer 230 are shown as being part of those blocks; however, it should be understood that codebook 340 may be stored externally to one or more of such blocks. Codebook 340 may be searched by quantizer 232 to find a best codeword as previously described, and index 234 may be used as an address for reading out a codeword of codebook 340 for use by beamformer 203.

To avoid the total number of calculations associated with a conventional quantizer 232, a reduced computational complexity quantizer is described below in additional detail. Notably, although the computational complexity reduction is described to minimize the number of resources and thus to effect a reduction in either or both of cost and power consumption for an FPGA implementation, it should be appreciated that a reduction in computational resources may be used to reduce semiconductor footprint of an application-specific integrated circuit ("ASIC") or another type of application-specific standard product ("ASSP") other than an FPGA.

In the following description, computational workload associated with a codebook search performed by quantizer 232 is reduced by modifying codebook entries. Codebook entries are modified such that on the whole they generally use less complicated complex numbers than a conventional codebook. One aspect of the modification is to ensure each entry of the codebook has only a real part or an imaginary part and not both, as described herein. In the following example, codebook entries are modified to form a new codebook or mapped codebook $W_M$. Entries in a conventional beamforming codebook are modified such that the product of $Hc_i$, for i equal to 0, . . . , N–1 may be computed in a multiplier-free hardware implementation of quantizer 232.

Although a hardware implementation is described, it should be appreciated that computation using the above-described set of values may be done in a software implementation of such calculation or a combination of hardware and software. However, for purposes of clarity by way of example and not limitation, it shall be assumed that quantizer 232 is implemented in hardware using an FPGA.

By avoiding use of multipliers, as well as effectively reducing the overall amount of circuitry resources to be used, it should be appreciated that a lower power application for implementation of a quantizer 232 may be achieved in comparison to a conventional quantizer. Furthermore, it should be appreciated that by reducing the number of resources used by quantizer 232, a simpler FPGA may be used, which may further reduce cost of the implementation. In short, the product of $Hc_i$ may be realized using multiplexers and 2's complementers, which may be implemented or instantiated using programmable logic of an FPGA.

Again, a MIMO-OFDM system divides a broad band wireless channel into a set of parallel narrow band channels. These narrow band channels in the context of MIMO-OFDM may be referred to as sub-channels or subcarriers. Each subcarrier may be considered a narrowband MIMO communication system. For a transmit beamforming and receive combining MIMO communication system, such as for example a MIMO-OFDM communication system, with $M_t$ transmit antennas, $M_r$ receive antennas, and K data subcarriers, a complex symbol transmitted on subcarrier k may be represented by $s_k$. The $M_t \times 1$ vector used by beamformer 203 for beamforming subcarrier k may be represented by $w_{b_k}$. The K beamforming vectors $w_{b_1}$ through $w_{b_K}$ may be chosen from a codebook W of cardinality N, where $b_k$ specifies the index of a beamforming vector chosen to beamform a subcarrier k and where $1 \leq b_k \leq N$. Each subcarrier may be transmitted with the same average power $E_s$, which may be met by setting $E[|s_k|^2] = E_s$ and $\|w_{b_k}\|_2 = 1$. Assuming time span of a channel impulse response is shorter than time span of a cyclic prefix, the baseband relationship between the symbol transmitted on subcarrier k and a corresponding received signal $x_k$, may be given by $$x_k = z_k^H H_k W_{b_k} s_k + z_k^H n_k. \quad (2)$$

Notably, the value of Equation (2) is provided as an output 239 of MRC 235 for demodulator 236. Output of demodulator 236 is recovered bits 240.

The $M_r \times 1$ noise vector $n_k$ may have i.i.d. (independent and identically distributed) entries, where each entry is assumed to be a circularly symmetric complex Gaussian number with 0 mean and variance $N_0$ per complex dimension. The $1 \times M_r$ vector used by MRC 235 for combining subcarrier k may be represented by $z_k$. The channel matrix for subcarrier k may be represented by $M_r \times M_t$ matrix $H_k$. The entries of this channel matrix are i.i.d., where each entry is a circularly symmetric complex Gaussian random variable with 0 mean and unit variance per complex dimension. A channel matrix $H_k$ may be assumed to be known at the receiver.

The SNR for a subcarrier k is $$SNR_k = \frac{E_s |z_k^H H_k w_{b_k}|^2}{\|z_k\|_2^2 N_0}. \quad (3)$$

Because the model in Equation (2) corresponds to a narrowband system, beamforming and combining vectors that maximize $SNR_k$ are, respectively:

$$w_{b_k} = \underset{w \in W}{\operatorname{argmax}} \|H_k w\|_2^2 \quad (4)$$

and $$z_k = \frac{H_k w_{b_k}}{\|H_k w_{b_k}\|_2}. \quad (5)$$

For this choice of $w_{b_k}$ and $z_k$, the SNR for subcarrier k is $$SNR_k = \frac{E_s}{N_0} \|H_k w_{b_k}\|_2^2. \quad (6)$$

Assuming a channel remains constant during transmission of a frame, and has independent realizations across different frames, CSI at transmitter 210 may be provided by receiver 220 using a low bit rate, which for purposes of clarity and not limitation is assumed to be noiseless with zero delay with respect to feedback path 230. As a set of codewords is known to both transmitter 210 and receiver 220, receiver 220 sends back to transmitter 210 indices $b_1$ through lN to specify codewords to use as beamforming vectors for transmission. Notably, a single index or multiple indices may be sent from receiver 220 to transmitter 210 to specify a codeword or codewords to use for various subcarriers of a MIMO-OFDM system for a transmission.

For a codebook W having a cardinality of N equal to $2^B$, each index $b_k$ (e.g., on subcarrier k) may be represented using B bits. This means that each subcarrier channel $H_k$ may be quantized into B bits by quantizer 232. Optionally, to reutilize hardware resources, quantizer 232 may process one subcarrier at a time. Alternatively, multiple subcarriers may be processed at a time in parallel. The total number of bits fed back via feedback path 230 may be equal to KB, which corresponds to B bits of feedback information per subcarrier. Notably, if a feedback channel 230 is not capable of conveying KB bits of information to a transmitter, known clustering strategies, such as those described in "Algorithms for quantized precoding in MIMO OFDM beamforming systems," by B. Mondal and R. W. Heath, in Proc. of Third SPIE Int. Symp. On Fluctuations and Noise, Austin Tex., May 2005, may be used.

At receiver 220, K channels may be quantized into KB bits. Quantizer 232 may conduct an exhaustive search according to Equation (4) for each subcarrier channel $H_k$. The input/output relationship for quantizer 232 may be mathematically expressed as:

$$b_k = \underset{1 \leq i \leq N}{\operatorname{argmax}} \|H_k w_i\|_2^2, \quad (7)$$

where $H_k$ indicates the channel matrix on subcarrier k and $w_i$ indicates a codeword, which is a beamforming vector. Equation (7) may be transformed into Equation (10) below for a mapped codebook as described in additional detail below.

Figure 3:
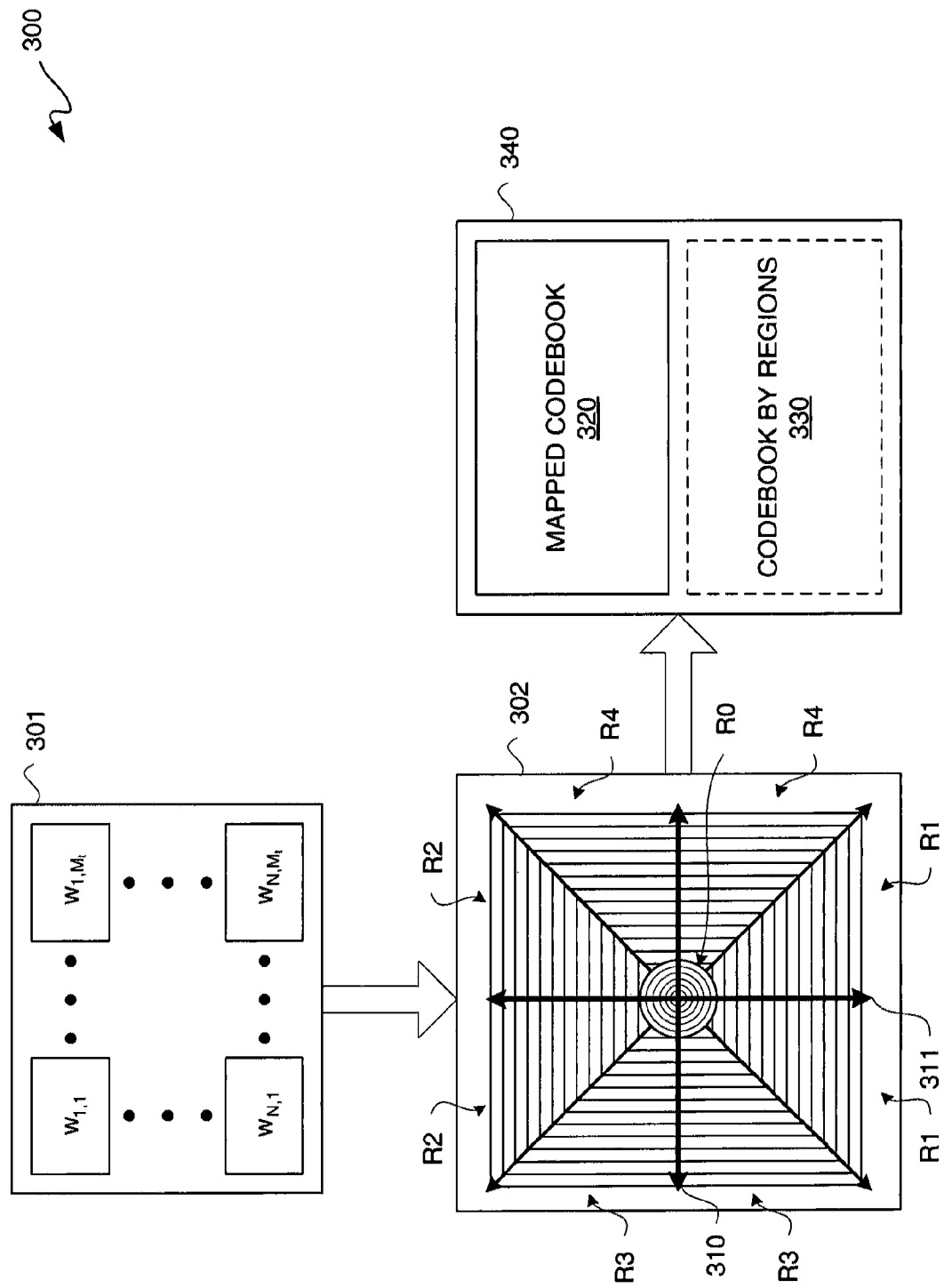
FIG. 3 is a flow diagram depicting an exemplary embodiment of a mapping flow.

Referring to FIG. 3, there is shown a flow diagram depicting an exemplary embodiment of a mapping flow 300. A codebook W 301 may be represented as a matrix with N rows and $M_t$ columns. Notably, any codebook W may be transformed into a mapped codebook $W_M$ in accordance with the mapping described herein, and any mapped codebook $W_M$ may be decomposed as:

$$W_m = G C_M, \quad (8)$$

where G is an N×N diagonal matrix whose entries are real numbers, and $C_M$ is an N×$M_t$ matrix whose entries belong to the set of $\{0, 1, \times 1, j, -j\}$.

Figure 6:
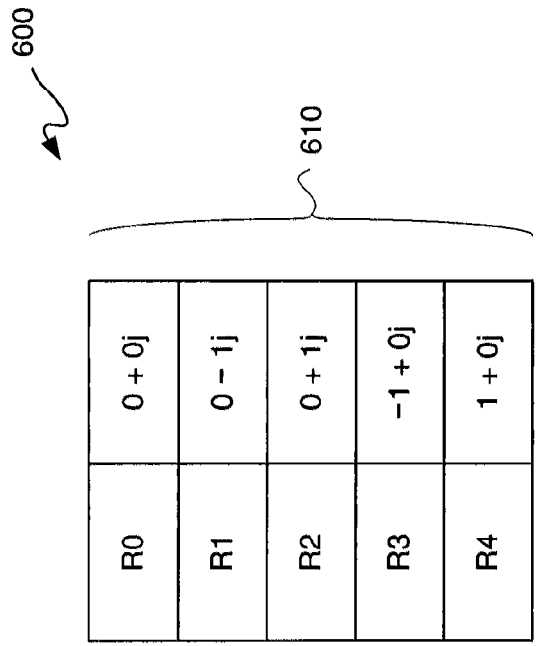
FIG. 6 is a table depicting an exemplary embodiment of mapping values and corresponding mapping regions.

Mapping of codebook 301 uses mapping regions 302, and corresponding region values in Table 600 of FIG. 6. Region 0, namely R0, which may be centered at the intersection of real axis 310 and imaginary axis 311 has an area that depends on a diameter D, where the diameter D may be set according to:

$$D = \frac{1}{\sqrt{M_t}}. \qquad (9)$$

Regions R1 through R4 may each have the same area, where the boundaries between these regions are defined by a 45-degree rotation of the complex plane axes 310 and 311 for real and imaginary values, respectively. The region values, or the values assigned to each mapping region R0 through R4, as indicated in Table 600 of FIG. 6, respectively are 0, −j, j, −1, and 1, namely mapping values 610. Notably, codebook 301 may be any known codebook that may be mapped in accordance with the description herein, including Grassmannian, Unitary Space-Time Constellation ("USTC"), or codebooks defined in standards such as IEEE 802.16e, or other known codebooks.

Mapping effectively projects via mapping regions each of the entries in codebook W 301 into a region of regions R0 through R4. In other words, the mapping involves taking each of the N×$M_t$ entries of codebook W 301 and mapping them one by one to an associated region selected from regions as listed in Table 600 of FIG. 6. Thus, for example, if the complex number corresponding to entry $w_{N,1}$ of a codebook is a complex number lying in region R2, then codebook entry $w_{N,1}$ is mapped to region R2 and assigned the value associated with region R2, namely j. Thus, each complex number from codebook W 301 is mapped to a corresponding location in matrix $C_M$ 401, by assigning a value of mapping values 610 corresponding to a region in which such complex number is located according to mapping function 302. Thus, a matrix $C_M$ 401 has the same matrix dimensions as codebook W 301. Again, a codeword may have one or more complex numbers, and thus an associated mapping value selected from 0, −j, j, −1, and 1 is assigned to each such complex number.

However, using matrix $C_M$ 401 as a mapped codebook $W_M$ 320 may involve an additional step of normalization. Possible beamforming vectors, such as in rows of matrix $C_M$ 401, may be normalized in order to meet power constraints at transmitter 210. A mapped codebook $W_M$ 320 may be generated with normalized values.

A mapped codebook may be represented either as a table of mapped entries themselves, namely mapped codebook 320, or alternatively using a region identifier that indicates the region in which the original codebook entries reside, namely codebook by regions 330. For example, in general terms, suppose a beamforming IEEE 802.16e codebook has eight codewords. Thus, for a transmitter with three transmit antennas, there would be a complex number of the form a+jb for each antenna for each codeword. Variables a and b may be positive, negative, or zero. However, for clarity, even in the case where one or more of a and b are zero, this is still referred to as a complex number. So, for this example there would be three complex numbers, one for each antenna, and thus a total of 24 complex numbers. Notably, not all complex numbers of the 24 in this example need to be unique. In other words, for example, two or more complex numbers for a codeword may be the same, and a complex number may be the same among two or more codewords.

If h, an entry of the channel matrix, is represented as a complex number of the form Re[h]+jIm[h], where Re[h] is a real component of the entry of the channel matrix and Im[h] is an imaginary component of the entry of the channel matrix, then multiplying the entry h of the channel matrix by a complex number associated with a region, results in one of the five possible outcomes, namely 0, h, −h, jh, and −jh. Thus, a result of 0 means that both real and imaginary components of the channel matrix are zeroed out. For a result of h, both real and imaginary components of the channel pass through without zeroing or negating. For a result of −h, both real and imaginary components of the channel are negated. For a result of jh, an imaginary component is negated and real and imaginary components are switched or exchanged. For a result of −jh, a real component is negated and real and imaginary components are switched or exchanged.

If normalization is not required, then matrix $C_M$ 401 is a codebook (e.g., $C_M$ 401 equals $W_M$), which means that multiplication by a normalizing matrix G is not needed, or in other words G is just the identity matrix. If normalization is required, then matrix $C_M$ 401 may be transformed into a codebook by multiplying by a normalizing diagonal matrix G, namely $W_M = GC_M$. Matrix G is equal to $diag(g_1, \ldots, g_N)$, where $g_p$ denotes the reciprocal of the norm of the pth row of $C_M$ 401. The result of such a multiplication is a mapped codebook 320. However, for purposes of clarity by way of example and not limitation, it shall be assumed that normalization is done in order to meet power constraints of transmitter 210.

Figure 4:
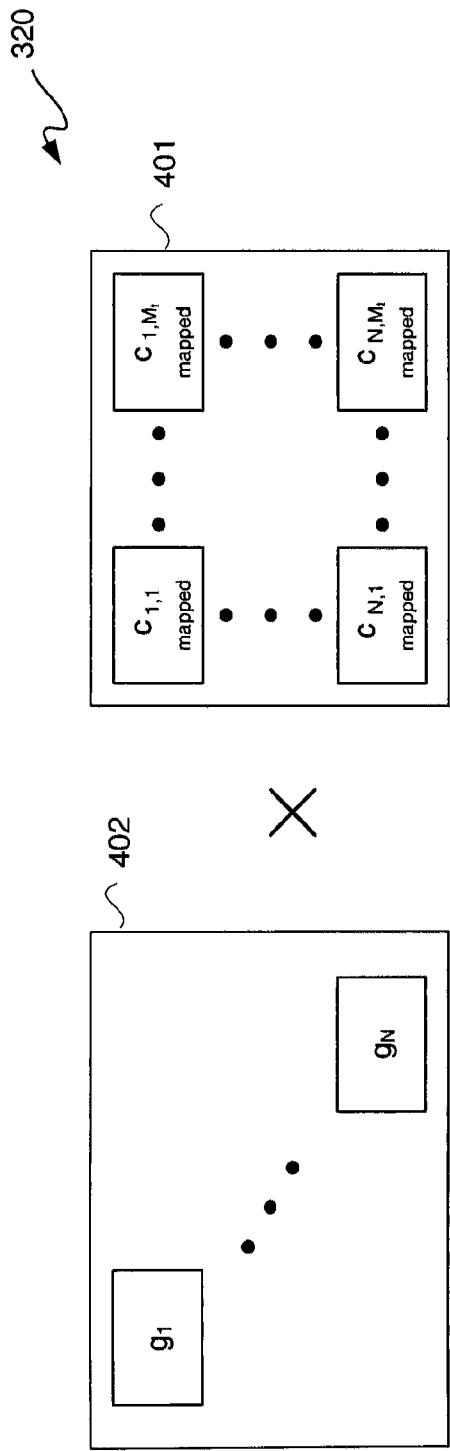
FIG. 4 is a block diagram depicting an exemplary embodiment of a mapped codebook by mapping values.

FIG. 4 is a block diagram depicting an exemplary embodiment of a mapped codebook $W_M$ 320. Mapped codebook $W_M$ 320 includes matrix $C_M$ 401 having mapped complex numbers $c_{1,1}$ through $C_{N,M_t}$ multiplied by a matrix of normalizing gain values, namely a diagonal matrix with $g_1$ to $g_N$ in the main diagonal, namely normalizing gain matrix 402. Thus, mapped codebook $W_M$ 320 stores complex numbers from mapping values 610 after mapping and normalizing.

Figure 5:
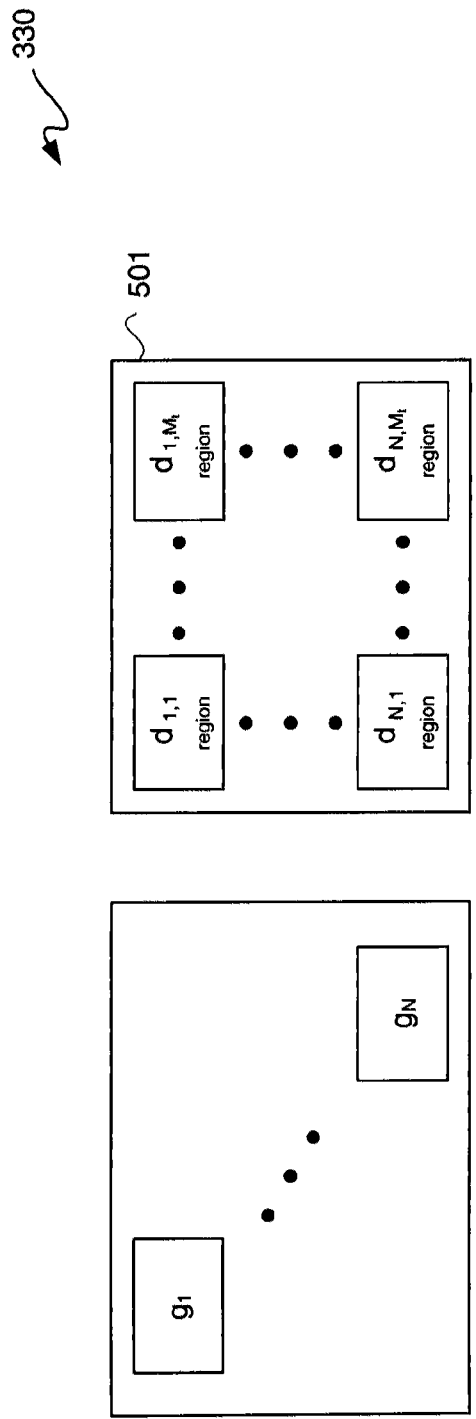
FIG. 5 is a block diagram depicting an exemplary embodiment of a mapped codebook by mapping regions.

FIG. 5 is a block diagram depicting an exemplary embodiment of a mapped codebook $W_M$ 330 by regions. Mapped codebook $W_M$ 330 by regions includes a normalizing gain matrix 402 and matrix 501, whose entries $d_{1,1}$ through $d_{N,M_t}$ are region identifiers that indicate regions in which source codebook entries reside. Codewords are vectors of complex numbers even when simplified as shown in FIG. 6, and may consume 4 or more bits each in memory for example. However, specifying one of regions R0 through R4 involves only 3 bits. Thus, regions may be stored instead of mapping values in mapped codebook $W_M$ 330.

Notably, the lower bound of diameter D is 0, and if entries of codebook W 301 of FIG. 3 all have the same norm, then this norm may be equal to $1/\sqrt{M_4}$ in order to have rows with a norm equal to 1. To avoid mapping all entries in this codebook W 301 to R0, D may be selected to be less than $2/\sqrt{M_4}$, as this is an upper bound for D. In this example, as described in Equation (9) above, D is selected as a mid-point between an upper and a lower bound for D. However, it should be appreciated that other choices between an upper and lower bound for D may be used depending on their effect on performance for a given application.

Any row or beamforming vector of $w_i$ of a mapped codebook is equal to $g_i c_i$, where $c_i$ is the ith row of $C_M$ 401 and $g_i$ is the reciprocal of the norm of $c_i$. Thus, the input-to-output relationship of quantizer 232 of FIG. 2B may be expressed as:

$$b_k = \underset{1 \le i \le N}{\operatorname{argmax}} \|H_k c_i\|_2^2 g_i^2. \qquad (10)$$

The computation of the argument of Equation (10) may be performed in three parts, where a first quantization ("Q") is to determine $Q_i^M$, followed by a second quantization to determine $Qn_i^M$, followed by a third quantization to determine $Qr_i^M$, where:

$$Q_i^M = H_k c_i \qquad (11)$$

$$Qn_i^M = \|Q_i^M\|_2^2 \qquad (12)$$

$$Qr_i^M = Qn_i^M g_i^2 \qquad (13)$$

For Equation (11), multiplying an entry of a channel matrix H 215 of FIG. 2A by an entry of $c_i$ may be done without actually using a multiplier. For example, rather than using a multiplier, only two multiplexers and two negators, such as 2's complementers, may be implemented as illustratively shown in FIG. 7.

Figure 7:
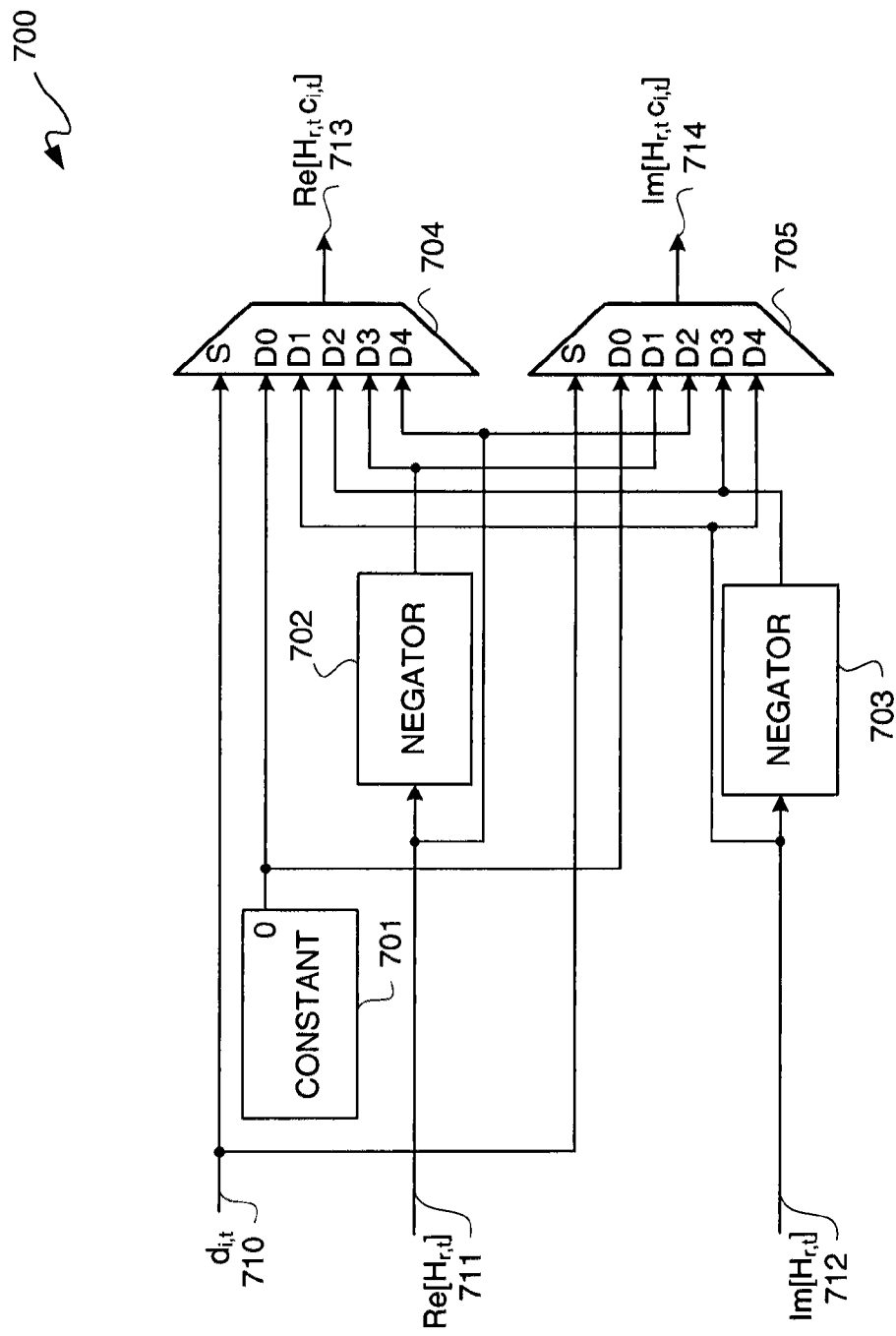
FIG. 7 is a block/circuit diagram depicting an exemplary embodiment of multiplication without using a multiplier in a circuit for a quantizer of the receiver of FIG. 2B.

FIG. 7 is a block/circuit diagram depicting an exemplary embodiment of multiplication of an entry of $c_i$ by an entry of $H_k$ without using a multiplier in circuit 700. Notably, t denotes the $t^{th}$ entry of a vector $c_i$, and $d_{i,t}$ denotes the corresponding region such as in Table 600 of FIG. 6. In addition to input $d_{i,t}$ 710, real portion 711 and imaginary portion 712 of $H_{r,t}$ are respectively input to negators 702 and 703, where such negators 702 and 703 may be respective 2's complement operations. $H_{r,t}$ denotes an entry in a row r and a column t of a channel matrix $H_k$ corresponding to subcarrier k.

Constant 701, namely a logic 0, is provided to respective data 0 ports of multiplexers 704 and 705. Input $d_{i,t}$ 710 is provided to respective select ports of multiplexers 704 and 705. Real portion 711, in addition to being provided as an input to negator 702, is provided to a D4 port of multiplexer 704 and to a D2 port of multiplexer 705. Imaginary portion 712, in addition to being provided as an input to negator 703, is provided as an input to a D1 port of multiplexer 704 and to a D4 port of multiplexer 705.

Negator 702 is for a negation or 2's complement operation to provide a negation of the real component of a channel matrix entry, namely $-\text{Re}[H_{r,t}]$. Output of negator 702 is provided to a D3 port of multiplexer 704 and to a D1 port of multiplexer 705. Negator 703 is for a negation or 2's complement operation to provide a negation of the imaginary component of a channel matrix entry, namely $-\text{Im}[H_{r,t}]$. Output of negator 703 is provided to a D2 port of multiplexer 704 and to a D3 port of multiplexer 705.

Accordingly, it should be appreciated from the prior description that there are only five possible inputs to each multiplexer, namely, 0, $\text{Re}[H_{r,t}]$, $-\text{Re}[H_{r,t}]$, $\text{Im}[H_{r,t}]$, and $-\text{Im}[H_{r,t}]$. The select signal to each multiplexer is thus in effect one of R0 through R4.

Output of multiplexer 704 is a real portion 713 of $H_{r,t} c_{i,t}$. Output of multiplexer 705 is an imaginary portion 714 of $H_{r,t} c_{i,t}$. For circuit 700, entries of $c_i$ belong to Table 600 of FIG. 6, as previously indicated, and thus they may be identified by the region to which they belong, namely $d_{i,t}$. The computation for Equation (11) for all N codewords may involve $2NM_t M_r$ multiplexers, $2NM_t M_r$ negators, and $(2NM_t M_r - 2NM_r)$ adders, and no multipliers.

Once $Q_i^M$ is determined, $Qn_i^M$ of Equation (12) may be determined for all codewords. Notably, the computation for Equation (12) may involve implementing $2NM_r$ multipliers and $(2NM_r - N)$ adders. $Qr_i^M$ for all codewords may be determined with Equation (13) after $Qn_i^M$ of Equation (12) is determined. Notably, once $Qn_i^M$ is determined, determining $Qr_i^M$ may involve only N multipliers. The search tree to find the largest $Qr_i^M$ for Equation (13) may involve (N−1) relational blocks.

It should be appreciated that using mapping or a mapped codebook as described herein reduces the number of multiplications and additions in part by trading off multipliers and adders for multiplexers. For example, using a mapped codebook for a system with six transmit antennas, four receive antennas, and five feedback bits per subcarrier may involve a total of 288 multipliers, 1,536 multiplexers, and 1,504 adders in comparison to 3,328 multipliers and 3,040 adders using a conventional codebook.

In addition to enhanced efficiency in resource utilization, another advantage of using a mapped codebook as described herein is flexibility in resource utilization. Using a mapped codebook allows an implementation of multiplication of an entry of $H_k$ times an entry of $c_i$ as described with reference to FIG. 7, but a designer may choose to implement some or all of these multiplications using multipliers. When implementing using an FPGA with embedded multipliers, this flexibility may be used by a designer to conserve embedded multipliers for other applications, or to use as many embedded multipliers as available and then implement the rest of the multiplications without using any multiplier in FPGA fabric, or more particularly in FPGA programmable logic, such as use of CLBs.

Figure 8:
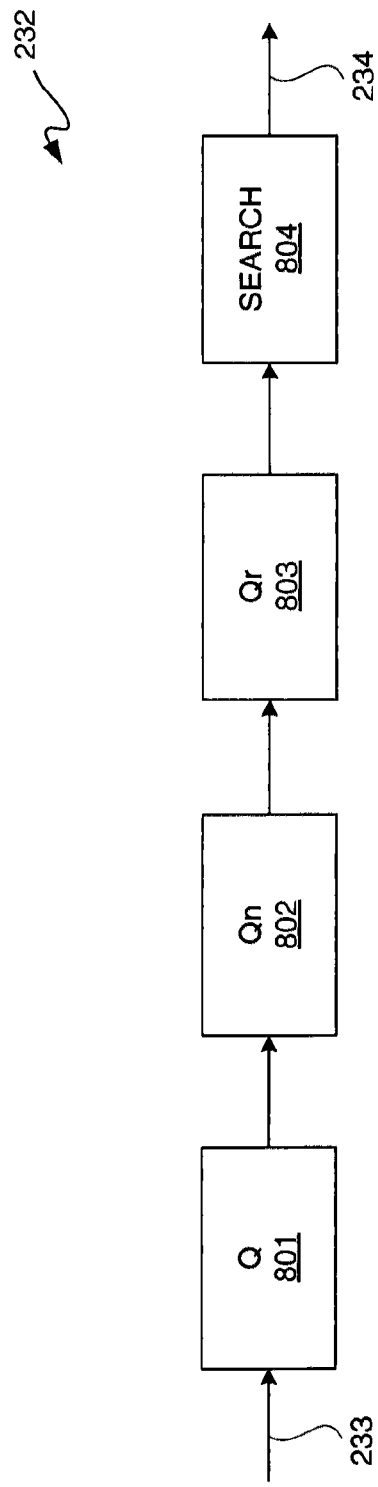
FIG. 8 is a block diagram of a pipeline implementation of a quantizer of the receiver of FIG. 2B.

Implementation of quantizer 232 of FIG. 2B may thus be based on a pipeline architecture as illustratively shown in FIG. 8. FIG. 8 is a block diagram of a pipeline implementation of a quantizer 232 of FIG. 2B. Notably, for purposes of clarity and not limitation, clock signaling is not illustratively shown in FIG. 8.

Input 233 to Q block 801 is to take an $H_k$ input and compute $Q_i^M$ according to Equation (11) for all N codewords. Output of Q block 801 is provided as an input to Qn block 802. Qn block 802 is for computing $Qn_i^M$ according to Equation (12) for all N codewords. Output of Qn block 802 is provided to Qr block 803. Qr block 803 is for computing $Qr_i^M$ according to Equation (13) for all N codewords.

Output of Qr block 803 is provided as an input to search block 804. Search block 804 may be implemented as a tree search to find a codeword with the greatest or largest $Qr_i^M$. Output of search block 804 is $b_k$ 234, which may be used as an index as previously described with respect to FIG. 2B. Thus, it should be appreciated that using a mapped codebook as described herein reduces computational complexity by use of a quantizer pipeline architecture, such as that illustratively shown in the block diagram of FIG. 8.

In the above example, it has been assumed that an IEEE 802.16e codebook has been used for comparison to a mapped codebook as described herein. Furthermore, it has been assumed that both ends of communication, namely the transmit and receive ends, use a mapped codebook as described herein for beamforming, MRC, and quantizing instead of using a standard IEEE 802.16e codebook or other conventional codebook. However, it is possible that both ends of a link do not use a mapped codebook as described herein for beamforming, MRC, and quantizing. Thus, for example, assuming that a conventional IEEE 802.16e codebook is used for beamforming and MRC, a mapped codebook as described herein may still be used for quantizer 232. This scheme is still compliant with the IEEE 802.16e standard and is a useful example, as most of the computational burden is associated with quantization, that is, with computing the index by a receiver in order to select the codeword for application of a beamforming vector or vectors by a transmitter, and not in the actual application of such beamforming vector or vectors to the data by the transmitter. Such a scenario is important for interoperability where one company manufactures the transmitter side and another company manufactures the receiver side of the system.

A mapped code book version of a conventional codebook, such as an IEEE 802.16e codebook for this example, may be obtained by following the mapping procedure described above. In such a hybrid architecture, a performance loss may be on the order of approximately one decibel or less as compared to an IEEE 802.16e-only implementation of both ends of the link, namely an IEEE 802.16e-only implementation for use of an IEEE 802.16e codebook by the beamformer, MRC block, and quantizer. Thus, approximately one decibel in performance may be sacrificed in order to be able to implement a reduced computational complexity quantizer architecture using a mapped codebook as described herein in the receiver for use with a low bit-rate feedback path. In other words, this trade-off of approximately one decibel in performance is to reduce computational complexity with regard to a reduction in quantizer resource utilization.

For implementing quantizer 232 as described herein, an output index that maximizes SNR based on a mapped codebook may not be the codeword which would be selected by an IEEE 802.16e-only implementation with respect to beamforming and MRC. Thus, for such hybrid implementations, the codeword selected by the mapped codebook-configured quantizer may correspond to the second- or third-best codeword with respect to maximizing SNR, and not the best codeword. However, it is believed that an approximately one-decibel loss in performance may be a useful trade-off for the reduction in system complexity, power consumption, and cost in many design applications.

Notably, for FPGAs, resources may be reutilized. For example, a multiplier or a multiplexer may be reutilized as long as the timing constraints are met. Reutilization reduces the amount of resources used but increases the delay of the system, so reutilization is possible as long as the timing constraints for the system are met. By allowing resource reutilization, a further reduction of the resources utilized may be obtained. By setting a resource reutilization factor equal to $C_q$ equal to $T_{OFDM}/(KT_{FPGA})$, the value of $C_q$ may be obtained by setting the constraint that all K channels are to be quantized in a time equal to the duration of an OFDM symbol, which is represented by $T_{OFDM}$. In other words, the input of a quantizer 232 may be refreshed every $T_{OFDM}/K$ seconds. In an IEEE 802.16e system using a mapped codebook-implemented quantizer 232 operating using Frequency Division Duplexing ("FDD"), feedback may be almost simultaneous with the downlink. With an FPGA clock period equal to $T_{FPGA}$, each of the blocks 801 through 804 in quantizer 232 of FIG. 8 has $C_q$ clock periods to perform their associated computations.

Again, using an IEEE 802.16e comparison to mapped codebook implementation, for K equal to 2,048 subcarriers with a 20 MHz bandwidth, where $M_t$ is equal to $M_r$ which is equal to 4, N is equal to $2^3$, and $T_{OFDM}$ is equal to 100.8 microseconds, assuming $T_{FPGA}$ is equal to 10 nanoseconds, the number of multipliers, multiplexers, and adders may be estimated. For example, using resource reutilization for an IEEE 802.16e implementation of the quantizer, the number of multipliers may be approximately 119 and the number of adders may be approximately 104. However, for a mapped codebook implementation using resource utilization, the number of multipliers may be approximately 16, the number of multiplexers may be approximately 53, and the number of adders may be approximately 52. Thus, by allowing some resource reutilization, use of a mapped codebook may further reduce the area associated with an implementation. Furthermore, it should be appreciated that the number of multipliers may be substantially reduced, resulting in a substantial reduction in multiplier complexity. This is merely one numerical example for purposes of clarity, and other numerical examples may be used.

Accordingly, it should be appreciated that a mapped codebook generation procedure has been described that allows for implementation of a reduced computational complexity quantizer architecture. Performance loss for a mapped codebook system on both ends of a link may be less than approximately 0.25 to 0.50 decibels.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for low bit-rate feedback wireless communication system, comprising:
obtaining a first set of information;
mapping the first set of information to a set of regions;
each region of the set of regions represented by a complex number having at least one portion set to a zero value;
the at least one portion being selected from a group consisting of an imaginary portion and a real portion;
providing a second set of information based upon the first set of information and the mapping of the first set of information to the set of regions; and
storing the second set of information for access by at least one component of the wireless communication system; wherein:
the set of regions consists of five regions associated with mapping values 0+j0, 1+j0, −1+j0, 0+j1, and 0−j1;
the 0+j0 mapping value of the mapping values is associated with a central region of the set of regions; and
the central region is a circular region having a diameter.

2. The method according to claim 1, wherein the first set of information is a source codebook and the second set of information is a mapped codebook.

3. The method according to claim 1, wherein the mapped codebook is stored as complex numbers for the second set of information.

4. The method according to claim 1, wherein the mapped codebook is stored as regions for the second set of information.

5. The method according to claim 1, further comprising:
determining normalizing gain associated with power constraints of a transmitter; and
including the normalizing gain in the mapped codebook.

6. The method according to claim 1, wherein the diameter is set to be less than a reciprocal of a square root of $M_t$, where $M_t$ is a number of transmit antennas of a transmitter of the wireless communication system.

7. The method according to claim 1, wherein the wireless communication system includes a transmitter and a receiver for providing one of a Multiple-Input Multiple Output or Multiple-Input Single Output wireless communication connectivity.

8. The method according to claim 7, wherein the mapped codebook is stored in the receiver and is not stored in the transmitter.

9. The method according to claim 7, wherein the transmitter is configured for eigen mode beamforming, the method further comprising:
   establishing a wireless feedback path from the receiver to the transmitter;
   providing from the transmitter to the receiver symbols associated with a channel matrix of the wireless communication connectivity;
   determining by a channel estimator of the receiver a dimensioned channel matrix for input to a quantizer of the receiver, the dimensioned channel matrix determined at least in part responsive to the symbols;
   performing a search by the quantizer on the dimensioned channel matrix using the mapped codebook accessible by the receiver to obtain an index indicative of a codeword for use by the transmitter for beamforming;
   sending the index from the receiver to the transmitter via the wireless feedback path; and
   selecting the codeword by a beamformer of the transmitter responsive to the index.

10. The method according to claim 9, wherein the codeword is stored in the mapped codebook accessible by the transmitter; and
   wherein equivalent versions of the mapped codebook are stored in both the receiver and the transmitter.

11. The method according to claim 9, wherein the codeword is stored in the mapped codebook accessible by the receiver; and
   wherein equivalent versions of the mapped codebook are not stored in both the receiver and the transmitter.

12. The method according to claim 9, wherein the quantizer is implemented as a pipelined quantizer having three stages for determining:

$$Q_i^M = H_k c_i$$

$$Qn_i^M = \|Q_i^M\|_2^2$$

$$Qr_i^M = Qn_i^M g_i^2.$$

in succession; and
   wherein multiplying of a channel matrix $H_k$ corresponding to subcarrier k by vector $c_i$ of the mapped codebook for i of a fixed cardinality is capable of being implemented without a multiplier.

13. The method according to claim 2, wherein the at least one component of the wireless communication system is a receiver having a quantizer, the quantizer being configured for determining:

$$Q_i^M = H_k c_i;$$

wherein multiplying of a channel matrix $H_k$ corresponding to subcarrier k by vector $c_i$ of the mapped codebook for i of a fixed cardinality is capable of being implemented without a multiplier by using circuitry to provide 0, $H_{r,t}$, $-H_{r,t}$, and $-jH_{r,t}$ for each entry $H_{r,t}$ of the channel matrix $H_k$, where $H_{r,t}$ denotes an entry in a row r and a column t of the channel matrix $H_k$, as respective input sets for multiplexed selection responsive to a region of the set of regions for providing both the imaginary portion and the real portion of $H_{r,t}c_{i,t}$, where $c_{i,t}$ denotes a $t^{th}$ entry of the vector $c_i$.

14. A receiver for a Multiple-Input Single-Output or Multiple-Input Multiple-Output wireless communication system, comprising:
   a quantizer, the quantizer having access to a mapped codebook;
   the mapped codebook generated by:
      obtaining a first set of information;
      mapping the first set of information to a set of regions;
      each region of the set of regions defined by a complex number having at least one portion set to a zero value;
      the at least one portion being selected from a group consisting of an imaginary portion and a real portion;
      providing a second set of information based upon the first set of information and the mapping the first set of information to the set of regions; and
      storing the second set of information as the mapped codebook for access by the quantizer;
   wherein:
      the set of regions consists of five regions associated with mapping values 0+j0, 1+j0, −1+j0, 0+j1, and 0−j1;
      the 0+j0 mapping value of the mapping values is associated with a central region of the set of regions; and
      the central region is a circular region having a diameter.

15. A transmitter for a Multiple-Input Single-Output or Multiple-Input Multiple-Output wireless communication system, comprising:
   a beamformer for eigen mode beamforming, the beamformer having access to a mapped codebook;
   the mapped codebook generated by:
      obtaining a first set of information;
      mapping the first set of information to a set of regions;
      each region of the set of regions defined by a complex number having at least one portion set to a zero value;
      the at least one portion being selected from a group consisting of an imaginary portion and a real portion;
      providing a second set of information based upon the first set of information and the mapping the first set of information to the set of regions; and
      storing the second set of information as the mapped codebook for access by the beamformer;
   the beamformer coupled to receive an index to the mapped codebook for selecting a codeword therefrom;
   the index indicative of the codeword for use by the transmitter for the eigen mode beamforming; and
   the index obtained by the transmitter via a wireless feedback path.

16. The receiver according to claim 14, wherein the quantizer is configured in part for determining:
   $Q_i^M = H_k c_i$, wherein for $H_k$ a channel matrix for subcarrier k for $c_i$ a vector of the mapped codebook for i of a fixed cardinality without using a multiplier by using circuitry to provide 0, $H_{r,t}$, $-H_{r,t}$, and $-jH_{r,t}$ for each entry $H_{r,t}$ of the channel matrix $H_k$, where $H_{r,t}$ denotes an entry in a row r and a column t of the channel matrix $H_k$, as respective input sets for multiplexed selection responsive to a region of the set of regions for providing both the imaginary portion and the real portion of $H_{r,t}c_{i,t}$, where $c_{i,t}$ denotes a $t^{th}$ entry of the vector $c_i$.

17. The transmitter according to claim 15, wherein the set of regions consists of five regions and associated with mapping values 0+j0, 1+j0, −1+j0, 0+j1, and 0−j1.

* * * * *